United States Patent
Hotate et al.

(10) Patent No.: US 7,679,732 B2
(45) Date of Patent: Mar. 16, 2010

(54) OPTICAL-FIBER-CHARACTERISTIC MEASURING APPARATUS AND OPTICAL-FIBER-CHARACTERISTIC MEASURING METHOD

(75) Inventors: Kazuo Hotate, Tokyo (JP); Kwang Yong Song, Tokyo (JP)

(73) Assignees: The University of Tokyo, Tokyo (JP); Yokogawa Electric Corporation, Tokyo (JP)

( * ) Notice: Subject to any disclaimer, the term of this patent is extended or adjusted under 35 U.S.C. 154(b) by 131 days.

(21) Appl. No.: 12/064,866

(22) PCT Filed: Nov. 24, 2006

(86) PCT No.: PCT/JP2006/323443

§ 371 (c)(1),
(2), (4) Date: Feb. 26, 2008

(87) PCT Pub. No.: WO2007/063774

PCT Pub. Date: Jun. 7, 2007

(65) Prior Publication Data

US 2009/0141267 A1   Jun. 4, 2009

(30) Foreign Application Priority Data

Dec. 1, 2005   (JP)   ............................. 2005-348482

(51) Int. Cl.
*G01N 21/00* (2006.01)
(52) U.S. Cl. .................................... 356/73.1
(58) Field of Classification Search ........................ None
See application file for complete search history.

(56) References Cited

U.S. PATENT DOCUMENTS

| 6,710,863 B2 | 3/2004 | Hotate et al. |
| 7,515,273 B2 * | 4/2009 | Bernini et al. ............... 356/477 |
| 2008/0013162 A1 * | 1/2008 | Shukunami et al. ......... 359/334 |
| 2008/0068586 A1 * | 3/2008 | Kishida et al. ................ 356/32 |
| 2008/0193126 A1 * | 8/2008 | Yamamoto .................... 398/34 |

FOREIGN PATENT DOCUMENTS

| CA | 2390048 A1 | 1/2003 |
| GB | 2381863 A | 5/2003 |
| JP | 64-086032 A | 3/1989 |
| JP | 09-105701 A | 4/1997 |
| JP | 3607930 B2 | 1/2005 |
| JP | 3667132 B2 | 7/2005 |
| WO | WO 2007086357 A1 * | 8/2007 |

* cited by examiner

*Primary Examiner*—Tarifur Chowdhury
*Assistant Examiner*—Gordon J Stock, Jr.
(74) *Attorney, Agent, or Firm*—Darby & Darby P.C.

(57) ABSTRACT

A measurement range is extended while maintaining the spatial resolution high by completely separating the increment of a probe light from noises. Modulations are performed on both probe light and pump light to differentiate both lights. Using the modulations, only the change in the probe light necessary for measuring the characteristic of a measurement-target optical fiber FUT can be separated. Accordingly, unlike the conventional technology, an optical wavelength filter becomes unnecessary. Further, in a case where an amplitude $\Delta f$ of the frequency modulation of a light source 1 is made wide to some extent to make the measurement range wide while maintaining a spatial resolution $\Delta z$ high, the amplitude $\Delta f$ does not affect to detection of the change in the probe light. Therefore, the increment of the probe light can be completely separated from noises, thereby extending the measurement range while maintaining the spatial resolution $\Delta z$ high.

6 Claims, 9 Drawing Sheets

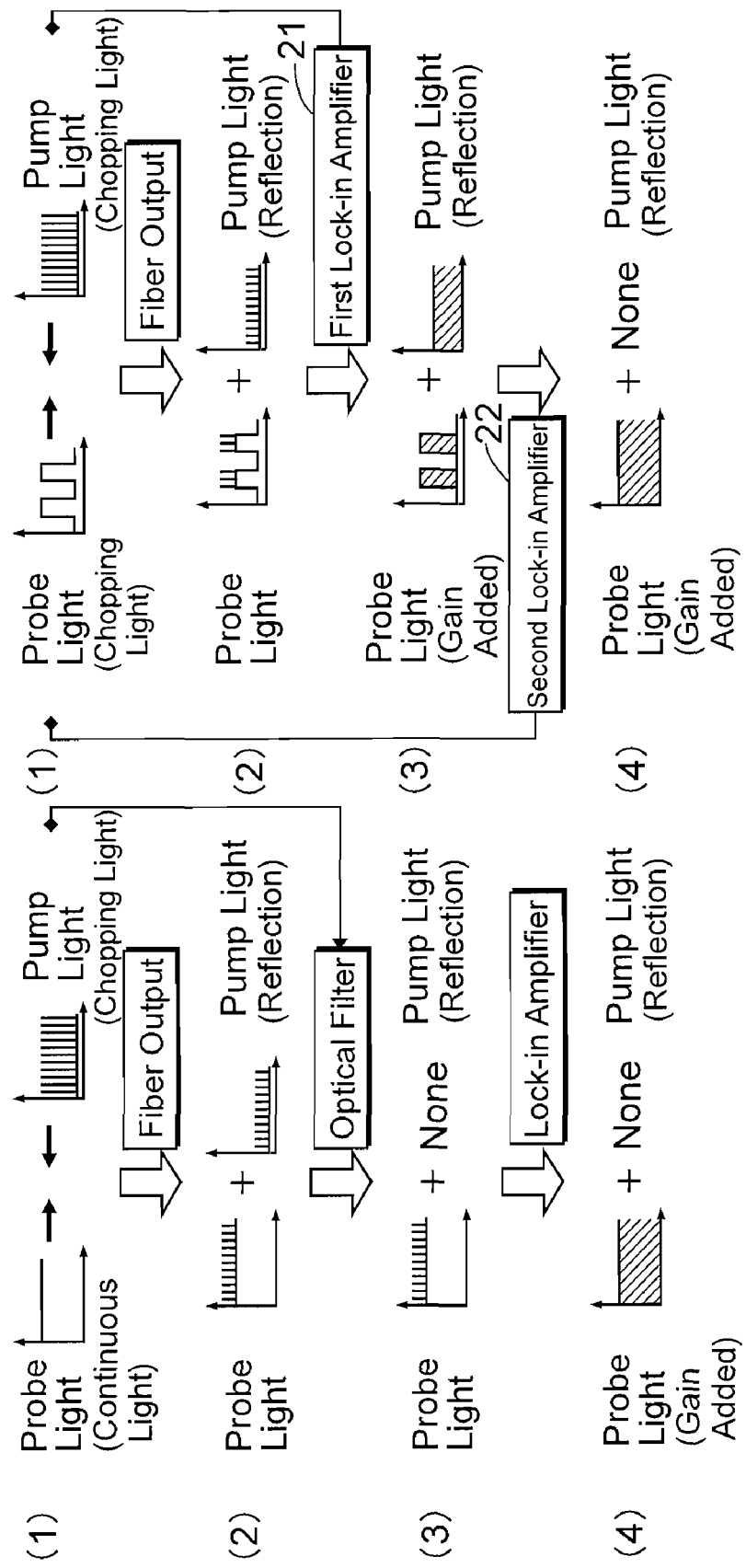

FIG.7
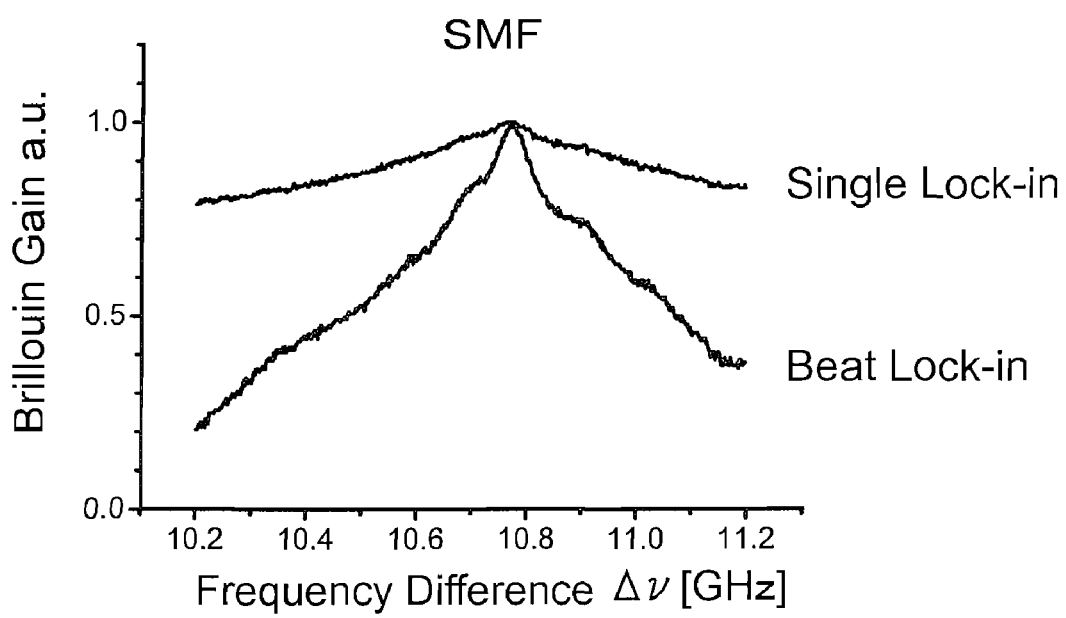
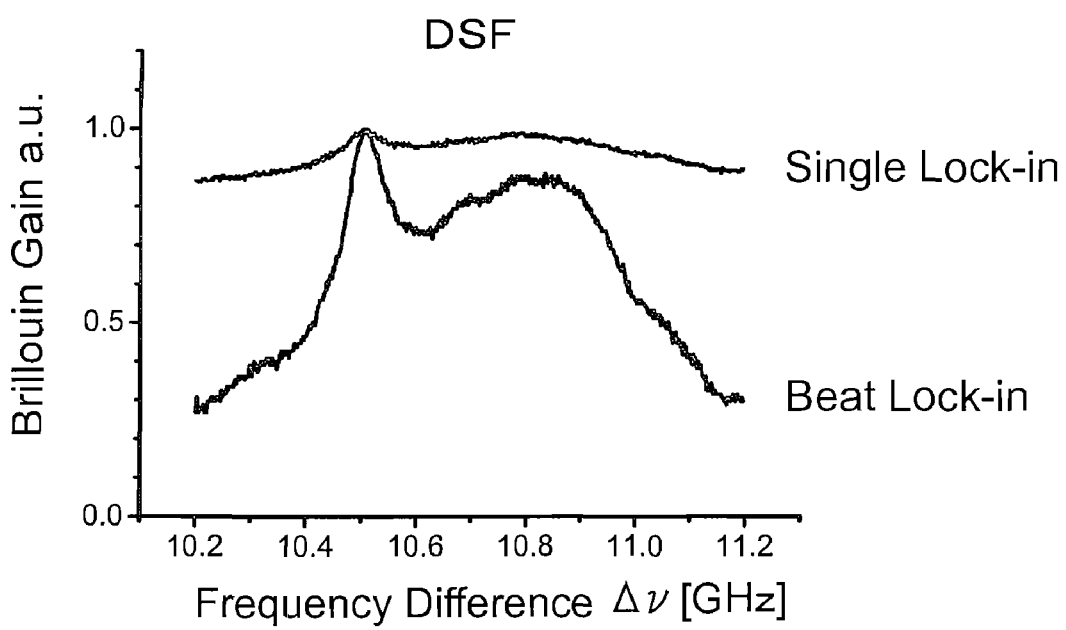

US 7,679,732 B2

OPTICAL-FIBER-CHARACTERISTIC MEASURING APPARATUS AND OPTICAL-FIBER-CHARACTERISTIC MEASURING METHOD

CROSS REFERENCE TO PRIOR RELATED APPLICATIONS

This application is a U.S. national phase application under 35 U.S.C. §371 of International Patent Application No. PCT/JP2006/323443, filed Nov. 24, 2006, and claims the benefit of Japanese Patent Application No. 2005-348482, filed Dec. 1, 2005, both of which are incorporated by reference herein. The International Application was published in Japanese on Jun. 7, 2007 as International Publication No. WO 2007/063774 A1 under PCT Article 21(2).

TECHNICAL FIELD

The present invention relates to an optical-fiber-characteristic measuring apparatus and an optical-fiber-characteristic measuring method, and more particularly, an optical-fiber-characteristic measuring apparatus and an optical-fiber-characteristic measuring method which utilize a stimulated Brillouin scattering phenomenon that occurs in a measurement-target optical fiber to sense the distribution of strains or the like applied to the optical fiber.

BACKGROUND ART

Brillouin scattering which occurs in an optical fiber changes in accordance with a strain applied to the optical fiber. A technology which measures the distribution of strains along the lengthwise direction of an optical fiber using such a phenomenon has been developed. That technology enables the measurement of the largeness of a strain by measuring the frequency change in a Brillouin scattering light, and enables the pinpointing of the strained portion of the optical fiber by measuring a time until the Brillouin scattering light comes back. Therefore, by causing an optical fiber to run across a construction, such as a bridge, a bridge column, a building, or a dam, and the material of the wing, fuel tank or the like of an aircraft, the distribution of strains applied to such a construction and a material can be detected. Based on the distribution of strains, the deterioration and the aged deterioration of the construction and the material can be known, resulting in disaster prevention and accident prevention.

According to a method of measuring a strain distribution amount which has been known so far, light pulses are input into an optical fiber, and a Brillouin scattering light scattered backwardly is measured in a time-resolving manner. According to such a method of measuring time regions by light pulses, however, the measurement time is long (taking several minutes to ten minutes), and the spatial resolution is limited (maximum: 1 m), so that the method is insufficient for an application where various constructions are dynamically managed. Therefore, users have been seeking a breakthrough technology which has a high spatial resolution and which can specify a portion where a strain is applied at a further short time.

To respond to such a sought, the inventors of the present invention propose, unlike the conventional time-resolving measurement method of light pulses, a technology of measuring the distribution of Brillouin scatterings along the lengthwise direction of an optical fiber by controlling the interference condition of continuous lights in Japanese Patent Publication No. 3667132 and Japanese Patent Publication No. 3607930, and acquire a patent for that technology. The technology is known as BOCDA (Brillouin Optical Correlation Domain Analysis), and achieves the 1 cm spatial resolution and the sampling rate of approximately 60 Hz, thereby attracting attention.

FIG. 8 is a structural diagram for an optical-fiber-characteristic measurement apparatus disclosed in Japanese Patent Publication No. 3667132. In the figure, reference numeral 101 denotes a light source which outputs a light modulated at a desired modulation frequency, and is structured in such a way that an injected current to a semiconductor laser (LD) 103 is modulated by a periodical signal generated from a signal generator 102, thereby causing the semiconductor laser 103 to generate a light undergone frequency modulation or phase modulation. The output light of the semiconductor laser 103 is divided into two by a first optical branch device 104, and the one light is input into an optical frequency modulator 105. The optical frequency modulator 105 inputs a microwave generated from a microwave generator to a light intensity modulator 108, performs amplitude modulation to generate a sideband which has a frequency difference equal to the microwave frequency with respect to the center frequency of an input light, and inputs it as a probe light into one end of a measurement-target optical fiber FUT. The other light divided by the first optical branch device 104 passes through an optical delay device 110 and a second optical branch device 111 in this order, and is input as a probe light into the other end of the measurement-target optical fiber FUT. Note that the optical delay device 110 is for setting a predetermined delay time between a pump light and a probe light. An output light from the measurement-target optical fiber FUT is divided by the second optical branch device 111, and only a lower sideband part is selected through an optical wavelength filter 112, and power thereof is measured through a light detector 113.

An explanation will now be given of the principle of Brillouin scattering. In a case where a light is input into a general optical fiber, in ultrasonic generated by thermal vibration of the glass molecules of the optical fiber material, an ultrasonic having a wavelength half of an input light wavelength is generated. Periodical change in the refraction index of glass originating from the ultrasonic work as Bragg diffraction grating, and reflect the light backwardly. This is a Brillouin scattering phenomenon. The reflected light is subjected to Doppler shift depending on the speed of the ultrasonic, and because the frequency shift amount changes in accordance with an expanding and contracting strain applied to the optical fiber, a strain can be detected by measuring the shift amount.

Specifically, two propagation waves having different frequencies, i.e., a stronger pump light and a weaker probe light are oppositely propagated into the measurement-target optical fiber FUT. At this time, as a particular phase matching condition is satisfied between the pump light and the probe light ($f_{pump}=f_{probe}+V_B$, where $f_{pump}$ is the center frequency of the pump light, $f_{probe}$ is the center frequency of the probe light, and $V_B$ is a Brillouin frequency), acoustic phonons which scatter photons from the pump light to the probe light are generated by the interaction between both waves. This brings about the amplification of the probe light as stimulated Brillouin scattering. However, when the frequency difference between the pump light and the probe light varies largely, stimulation is suppressed.

As explained in, for example, Japanese Patent Publication No. 3667132, the basic principle of the BOCDA method is to generate intensive stimulated Brillouin scattering depending on a position along the measurement-target optical fiber FUT by performing the same frequency modulation on the pump light and the probe light propagated oppositely. Thus, according to the BOCDA method, lights from the light source 101 serve as continuous oscillation lights, the oscillation frequencies thereof are changed by the repeated waveform of a sine wave through the signal generator 102, and the optical frequency modulator 105 changes the center frequency $f_{probe}$ of the probe light in such a way that the difference between the center frequency $f_{probe}$ of the probe light and the center frequency $f_{pump}$ of the pump light becomes close to the Brillouin frequency $V_B$. Accordingly, at most positions where the phases of the pump light and the probe light becomes asynchronous and the correlation is low, stimulation is suppressed, but at a specific narrow position (correlation position) in a cm order where the phases of the pump light and the probe light are synchronous and the correlation of both lights is high, stimulated Brillouin scattering occurs. Shifting the correlation position enables the measurement of the distribution of a strain by Brillouin scattering.

According to the apparatus shown in FIG. 8, a laser light undergone frequency modulation from the light source 101 is separated by the first optical branch device 104, the one laser light is input into the optical frequency modulator 105, modulated (intensity modulated) and input as a probe light, which has an adjustable optical frequency, into one end of the measurement-target optical fiber FUT. On the other hand, the other laser light separated by the first optical branch device 104 is subjected to a predetermined time delay by the optical delay device 110, and is input as a pump light into the other end of the measurement-target optical fiber FUT through the second optical branch device 111.

Because both of the probe light and the pump light are lights subjected to frequency modulation by the same light source 101, the probe light and the pump light input into the measurement-target optical fiber FUT indicate a periodical correlation peak along the measurement-target optical fiber FUT. At a position where the correlation peak is indicated, the optical-frequency difference between the probe light and the pump light is stable, so that the optical intensity is amplified by a stimulated Brillouin scattering phenomenon. On the other hand, at most positions other than that position, the optical frequencies of the probe light and the pump light constantly fluctuate, so that the probe light is not affected by Brillouin amplification, and the optical intensity does not change substantially. Therefore, the most part of the gain that the probe light acquires by Brillouin amplification occurs at the position where the correlation peak is indicated.

The probe light which has acquired a gain by Brillouin amplification is emitted from the other end of the measurement-target optical fiber, and then input into the optical wavelength filter 112 through the second optical branch device 111. The optical branch filter 112 selects only a low frequency sideband light from the probe light, and the intensity thereof is detected through the light detector 113.

FIG. 9 is a diagram exemplifying correlation peaks in the measurement-target optical fiber FUT in FIG. 8. In the figure, reference symbol $f_m$ denotes a frequency-modulation frequency applied to the semiconductor laser 103, and reference symbol $d_m$ denotes an interval between adjoining correlation peaks. To selectively measure stimulated Brillouin scattering occurring at a point in the measurement-target optical fiber FUT, a region where the pump light and the probe light are oppositely propagated should be limited by optical isolators to cause only one correlation peak to be present therein, as shown in the figure. Note that an explanation is given of an example case where the laser light from the semiconductor laser 103 is subjected to frequency modulation, but in a case where the laser light from the semiconductor laser 103 is subjected to phase modulation by the signal generation circuit 102, the symbol $f_m$ should be given of a different reading as a modulated frequency undergone phase modulation. That is, frequency modulation includes a phase modulation technology. As shown in FIG. 9, at a position where the probe light and the pump light input into the measurement-target optical fiber FUT indicate a correlation peak, stimulated Brillouin scattering intensively occurs. The peaks of the waveform denoted by the reference numerals 120 to 122 indicate correlation peaks, and 120 indicates a zero-order correlation peak, 121 indicates a first-order correlation, and 122 indicates a second-order correlation peak. Note that the position of the zero-order correlation peak is a position where the optical path difference between the probe light and the pump light becomes zero.

The interval $d_m$ of correlation peaks can be expressed by the following equation 1, where $f_m$ denotes the frequency-modulation frequency of the light source 101, and $V_g$ denotes a light speed in the measurement-target optical fiber FUT.

$$d_m = V_g/2f_m \qquad \text{[Equation 1]}$$

According to the equation 1, it is found that the interval $d_m$ of correlation peaks is determined by the frequency-modulation frequency $f_m$ applied to the semiconductor laser 103.

FIG. 10 is a diagram showing how the positions of correlation peaks change when the frequency-modulation frequency $f_m$ is changed. As shown in the figure, as the frequency-modulation frequency $f_m$ is changed, the interval $d_m$ of correlation peaks changes, thus the positions of correlation peaks change. In this manner, the correlation peak positions, i.e., measurement positions are changed, and distribution measurement is realized. Because it is necessary to cause only one correlation peak to be present in a region sandwiched by optical isolators, the measurement range of distribution measurement becomes $d_m$. However, the position of the zero-order correlation peak 120 does not change even if only the frequency-modulation frequency $f_m$ is changed. The symbol $\Delta z$ in FIG. 10 denotes a correlation peak width which is a spatial resolution of distribution measurement.

As mentioned before, the position of the zero-order correlation peak 120 is a position where the optical path difference between the probe light and the pump light becomes zero. FIG. 11 is a diagram showing how the position of the zero-order correlation peak 120 is adjusted. As a delay time by the optical delay device 110 is adjusted, the position of the zero-order correlation peak 120 is changed as shown in FIG. 11. The position of the zero-order correlation peak 120 does not depend on the frequency-modulation frequency $f_m$. Therefore, adjusting the delay time by the optical delay device 110 makes it possible to shift not only the zero-order correlation peak 120 but also the first-order correlation peak 121 and the second-order correlation peak 122 without changing the correlation peak interval $d_m$. In this case, the measurement range of distribution measurement also becomes $d_m$.

However, it makes no sense if the spatial resolutions $\Delta z$ of the correlation peaks 120 to 122 become larger than the distances that the positions of the correlation peaks are shifted. Now, let us suppose that the Brillouin gain line width of the measurement-target optical fiber be $\Delta V_B$, the frequency-modulation frequency of the light source 101 be $f_m$, the amplitude of frequency modulation of the light source 101 be $\Delta f$, and the light speed in the measurement-target optical fiber be $V_g$, then the spatial resolution $\Delta z$ can be given by the following equation 2.

$$\Delta z = (V_g \cdot \Delta V_B)/2\pi f_m \cdot \Delta f \qquad \text{[Equation 2]}$$

Therefore, from the equation 2, it is necessary that the spatial resolution Δz should be adjusted in such a manner as to be sufficiently small with respect to a shifted distance while adjusting, for example, the frequency-modulation frequency $f_m$ of the light source 101.

Further, the number N of available sensing points corresponding to correlation peaks in the measurement range $d_m$ of distribution measurement can be taken as evaluation parameters for the apparatus. The number N of sensing points is given by a ratio between the correlation peak interval $d_m$ and the spatial resolution Δz, and is given by the following equation.

$$N \equiv d_m/\Delta z = (\pi \cdot f)/\Delta V_B$$

According to the apparatus shown in FIG. 8, stimulated Brillouin scattering is suppressed at most positions in the measurement-target optical fiber FUT by optical frequency modulation performed by the light source 101, but at a specific correlation position, the relative frequency difference between the pump light and the probe light becomes constant, and stimulated Brillouin scattering occurs. The correlation position where stimulated Brillouin scattering occurs periodically appears along the measurement-target optical fiber FUT because frequency modulation on the probe light and the pump light are periodical. Therefore, to measure the characteristic of the measurement-target optical fiber FUT, it is necessary to insert optical isolators in such a way that only one correlation peak is present in a position in the measurement-target optical fiber FUT as mentioned before, and to adjust the delay amount of the optical delay device 110 and the frequency-modulation frequency $f_m$ applied to the semiconductor laser 103.

As shown in the foregoing equation 1, the correlation peak interval $d_m$ is inversely proportional to the frequency-modulation speed (frequency-modulation frequency $f_m$) of the light source 101. Accordingly, when the modulation frequency $f_m$ of the light source 101 is lowered to make the frequency change thereof gradual, the correlation peak interval $d_m$ and therefore the measurement range can be made wider. However, when the correlation peak interval $d_m$ is made wide, the width of a correlation part also becomes wide, and as shown in the equation 3, the spatial resolution Δz is deteriorated and becomes a large value at the same sensing point number N. Accordingly, to make the measurement range of the apparatus wide while maintaining the spatial resolution Δz high, it is necessary to increase the amplitude (modulation amplitude) Δf the frequency modulation of the light source 101, and to increase the substantive number N of sensing points.

Regarding this point, the apparatus shown in FIG. 8 separates the increment part (signal) of the probe light from the reflection part (noise) of the pump signal that the frequency is different at approximately 10 GHz by the optical wavelength filter 112 provided ahead of the light detector 113. According to such a structure, however, it is difficult to make the amplitude Δf of the frequency modulation of the light source 101 wide unlimitedly to extend the measurement range while maintaining the spatial resolution Δz high. This is because that when the amplitude Δf exceeds approximately 5 GHz which is the half of the Brillouin frequency $V_B$ of the measurement-target optical fiber FUT, the spectra of the pump light and the probe light become overlapped, and separation of both lights by the optical wavelength filter becomes impossible. Therefore, to set the spatial resolution Δz in an order of several cm, there is no other choice to set an output light from the light source 101 to have a speed of 10 MHz or so, and the measurement range which is the length of the measurement-target optical fiber FUT is limited to 10 m or so.

An apparatus shown in FIG. 12 is proposed in Japanese Patent Publication No. 3607930 to overcome the foregoing problem. The apparatus has a pulse modulator 131 like an EO switch in lieu of the optical delay device 110 in FIG. 8, and has a timing adjuster 132 provided between the second optical branch 111 and the optical wavelength filter 112. The pulse modulator 131 modulates the other light separated by the first optical branch device 104 to a pulse-like pump light, and outputs it. The timing adjuster 132 performs gate-on in accordance with the pulse timing of the pump light, and selects one correlation peak from correlation peaks which appear repeatedly along the measurement-target optical fiber FUT.

The probe light as a continuous light is input into the one end of the measurement-target optical fiber FUT, while the pulse-like pump light is input into the other end. Accordingly, as shown in FIG. 13, in the measurement-target optical fiber FUT, the pump light (see, L2 in the figure) passes through correlation peaks P0 to PN (where N is a positive integer) in a time-oriented manner at different positions in the measurement-target optical fiber as it is propagated in the measurement-target optical fiber FUT. FIG. 13 shows how the pump light passes through correlation peaks in a time-oriented manner in the measurement-target optical fiber FUT along with the progression of the pump-light pulse.

Therefore, in considering a time when the pump light passes through the vicinity of a measurement point set in the measurement-target optical fiber FUT and a time until a light in the vicinity of the measurement point reaches the timing adjuster 132, only a light from the vicinity of the measurement point can be measured. In this way, the timing adjuster 132 has an operation timing adjusted in consideration of a timing at which the pulse modulator 131 makes a laser light pulsed, a time until the pump light emitted from the pulse modulator 131 is input into the other end of the measurement-target optical fiber FUT through the second optical branch device 111, a time until the pump light reaches the vicinity of the measurement point from the other end of the measurement-target optical fiber FUT, a time until a light from the vicinity of the measurement point reaches the other end of the measurement-target optical fiber FUT, and a time until the light reaches the timing adjuster 132 through the second optical branch device 111 from the other end of the measurement-target optical fiber FUT.

According to the apparatus shown in FIG. 12, the pulse modulator 131 cuts out pulses each having a length of 10 m or so from the laser light from the light source 101, and the timing adjuster 132 performs gating in accordance with the timings of the pulse-like pump lights, thereby selecting a correlation peak at a specific position in the measurement-target optical fiber FUT. According to this scheme, however, it is necessary to generate a narrow optical pulse having a ratio of 30 to 1 to obtain, for example, a measurement range of 300 m, the utilization efficiency of light energy decreases, and the signal accuracy is deteriorated. Moreover, the measurement time becomes long.

Regarding the BOCDA method, to detect the slight increment of a probe light due to a stimulated Brillouin phenomenon sensitively, there is known a scheme of performing intensity modulation on the pump light, and performing synchronous detection on an increased probe light from the measurement-target optical fiber FUT by a lock-in amplifier at the modulated frequency in the apparatus shown in FIG. 8. Some of the pump light, however, return to the optical detector 113 due to reflection and backward scattering in the measurement-target optical fiber FUT, and the returning light is also modulated at the synchronous detection frequency, noises are to be output from the lock-in amplifier. Therefore, it is necessary to employ a structure that the optical wavelength filter 112 is provided ahead of the optical detector 113 to select only the probe light, and when the amplitude Δf of the frequency modulation of the light source 101 is made wide to extend the measurement range while maintaining the spatial resolution Δz high, separation of both lights becomes impossible no matter what kind of optical wavelength filter 112 is used at a stage exceeding 5 GHz. As a result, it is difficult to overcome a problem such that noises increase, or the spatial resolution and the measurement range are limited.

The present invention has been made in view of the foregoing problem, and it is an object of the invention to provide a new optical-fiber-characteristic measuring apparatus and optical-fiber-characteristic measuring method which completely separate the increment of a probe light from noises, and which can extend a measurement range while maintaining a spatial resolution high.

SUMMARY OF THE INVENTION

To achieve the object, according to the invention, not only a pump light but also a probe light are subjected to modulations, and using the two modulations, only the change in the probe light originating from stimulated Brillouin scattering is picked out from outgoing lights from a measurement-target optical fiber.

That is, an optical-fiber-characteristic measuring apparatus of the invention comprises:

a light source unit which outputs an oscillation light undergone frequency modulation;

probe light generating means for performing frequency shifting on an output light from the light source unit, and inputting that light as a probe light into one end of a measurement-target optical fiber;

pump light generating means for inputting an output light from the light source as a pump light into an other end of the measurement-target optical fiber;

modulation means for performing modulations on both probe light and pump light;

detection means for separating only a change in the probe light originating from stimulated Brillouin scattering from an outgoing light from the measurement-target optical fiber, using the two modulations performed by the modulation means; and measurement means for measuring a characteristic of the measurement-target optical fiber based on data on the change in the probe light acquired by the detection means.

In this case, it is preferable that the modulation means should include a first intensity modulation unit which performs intensity modulation on the pump light and a second intensity modulation unit which performs intensity modulation on the probe light at a different frequency from the pump light, and the detection means should include a first synchronous detection unit which performs synchronous detection on an outgoing light from the measurement-target optical fiber at an intensity-modulation frequency to the pump light, and a second synchronous detection unit which performs synchronous detection on an output from the first synchronous detection unit at a intensity-modulation frequency to the probe light.

Alternatively, as another apparatus structure, it is preferable that the modulation means should include a first intensity modulation unit which performs intensity modulation on the pump light, and a second intensity modulation unit which performs intensity modulation on the probe light at a different frequency from the pump light, and the detection means should include a synchronous detection unit which performs synchronous detection on an outgoing light from the measurement-target optical fiber at a difference frequency between an intensity-modulation frequency to the pump light and an intensity-modulation frequency to the probe light.

An optical-fiber-characteristic measuring method of the invention comprises:

performing frequency shifting on an oscillation light undergone frequency modulation;

inputting that light as a probe light into one end of a measurement-target optical fiber;

inputting the oscillation light undergone frequency modulation as a pump light into an other end of the measurement-target optical fiber;

performing modulations on both probe light and pump light;

separating only a change in the probe light originating from stimulated Brillouin scattering from an outgoing light from the measurement-target optical fiber, using the two modulations performed on the probe light and the pump light; and measuring a characteristic of the measurement-target optical fiber from data on the change in the probe light.

In this case, it is preferable that the foregoing method should further comprise: performing intensity modulation on the pump light, and performing intensity modulation on the probe light at a different frequency from the pump light to thereby perform modulations on both probe light and pump light; and performing synchronous detection on an outgoing light from the measurement-target optical fiber at an intensity-modulation frequency to the pump light, and performing synchronous detection on an output acquired by that synchronous detection at an intensity-modulation frequency to the probe light to thereby separate only the change in the probe light originating from stimulated Brillouin scattering.

Alternatively, as a different method, it is preferable that the foregoing method should further comprise: performing intensity modulation on the pump light, and performing intensity modulation on the probe light at a different frequency from the pump light to thereby perform modulations on both probe light and pump light; and performing synchronous detection on an outgoing light from the measurement-target optical fiber at a difference frequency between an intensity-modulation frequency to the pump light and an intensity-modulation frequency to the probe light to thereby separate only the change in the probe light originating from stimulated Brillouin scattering.

According to the optical-fiber-characteristic measuring apparatus and the optical-fiber-characteristic measuring method of the invention, modulations are performed on both probe light and pump light to differentiate both light, and using the modulation, not the frequency difference between the probe light and the pump light, only the change in the probe light necessary for measuring the characteristic of the measurement-target optical fiber can be separated. Accordingly, unlike the conventional technology, an optical fiber becomes unnecessary. In a case where the amplitude of the frequency modulation of the light source is made wide to some extent to extend the measurement range while maintaining the spatial resolution high, the amplitude does not affect to detection of the change in the probe light. Therefore, the increment of the probe light can be completely separated from noises, and the measurement range can be extended while maintaining the spatial resolution high.

According to the optical-fiber-characteristic measuring apparatus and the optical-fiber-characteristic measuring method of the invention, because intensity modulations are performed on both pump light and probe light at different frequencies, when synchronous detections are performed doubly on an outgoing light from the measurement-target optical fiber at an intensity-modulation frequency to the pump light and an intensity-modulation frequency to the probe light, only the change in the probe light necessary for measuring the characteristic of the measurement-target optical fiber can be effectively separated.

Further, according to the optical-fiber-characteristic measuring apparatus and the optical-fiber-characteristic measuring method of the invention, because intensity modulations are performed on both pump light and probe light at different frequencies, when synchronous detection is performed on an outgoing light from the measurement-target optical fiber at a difference frequency between the intensity-modulation frequency to the pump light and the intensity-modulation frequency to the probe light, only the change in the probe light necessary for measuring the characteristic of the measurement-target optical fiber can be effectively separated. Further, because one-time synchronous detection is performed at the difference frequency between the two modulation frequencies, the frequency of the synchronous detection can be set high while maintaining the measurement speed fast.

BRIEF DESCRIPTION OF DRAWING

FIGS. 2(a) and 2(b) are schematic diagrams showing the comparison in operations between a conventional single lock-in scheme and a double lock-in scheme of the embodiment;

FIG. 4(a) is a graph of Brillouin gain spectra BGS corresponding to a single mode optical fiber SMF section and a dispersion-shifted optical fiber DSF section, and FIG. 4(b) is a graph showing Brillouin peak frequencies measured around the dispersion-shifted optical fiber DSF section;

FIG. 5(a) is a graph of Brillouin gain spectra BGS measured around the dispersion-shifted optical fiber DSF section in the single lock-in scheme, and FIG. 5(b) is a graph showing Brillouin gain spectra BGS measured around the dispersion-shifted optical fiber DSF section in the double lock-in scheme;

FIG. 7 shows comparison data between the single lock-in scheme and the double lock-in scheme, and is a graph showing Brillouin gain spectra BGS corresponding to a single mode optical fiber SMF section and a dispersion-shifted optical fiber DSF section;

DETAILED DESCRIPTION OF THE INVENTION

Explanations will be given of preferable optical-fiber-characteristic measuring apparatuses and optical-fiber-characteristic measuring methods of the present invention with reference to the accompanying drawings.

Figure 1:
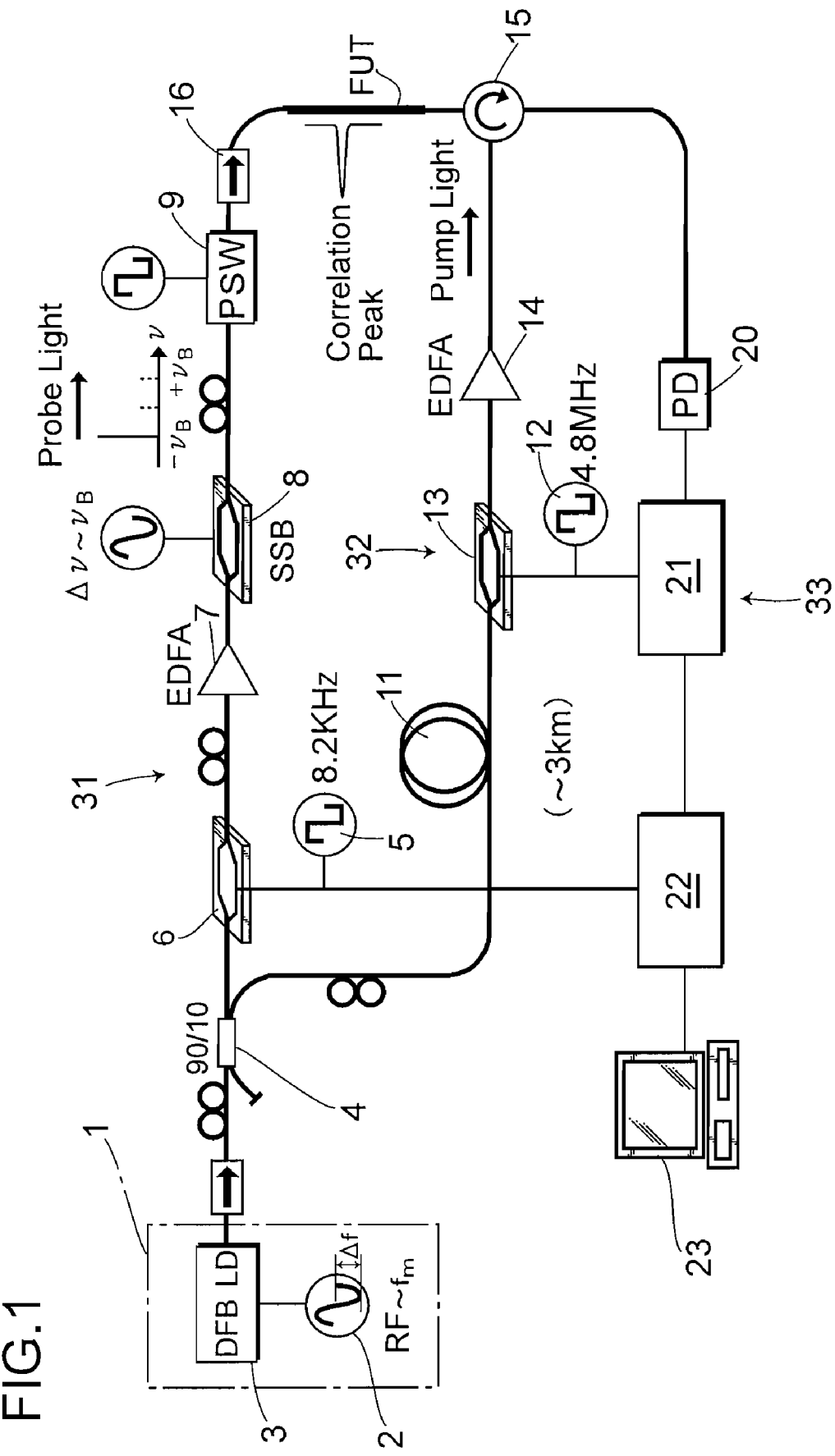
FIG. 1 is a block diagram showing the structure of an optical-fiber-characteristic measuring apparatus according to the first embodiment of the invention.

FIG. 1 shows an optical-fiber-characteristic measuring apparatus according to the first embodiment. In the figure, reference numeral 1 denotes a light source which comprises a signal generator 2 and a semiconductor laser 3. A possible semiconductor laser 3 is, for example, a distributed feedback laser diode (DFB LD) which is small in size and emits a laser light having a narrow spectrum width. The signal generator 2 is for outputting a desired modulated signal as an injected current to the semiconductor laser 3 to perform sinusoidal frequency modulation or phase modulation on laser continuous lights emitted from the semiconductor laser 3.

Reference numeral 4 denotes a first optical branch device which divides the outgoing light into two at a ratio of, for example, 90/10, the one divided laser light is subjected to intensity modulation by a second optical intensity modulator 6 including a second reference signal generator 5, and is amplified by a second erbium-doped optical fiber amplifier (hereinafter called EDFA) 7. The intensity-modulated light amplified by the second EDFA 7 is subjected to frequency reduction of approximately 10 GHz by a single sideband (hereinafter called SSB) modulator 8, and is input as a probe light into one end of the measurement-target optical fiber FUT.

The SSB modulator 8 uses a microwave and accurate DC bias control to suppress higher frequency components in two first-order sidebands and maintain a stable frequency difference $\Delta V$ from a pump light, and outputs a low frequency sideband, which has a frequency difference $\Delta V$ equal to a microwave frequency with respect to an input light, as a probe light. A polarization switch (PSW) 9 for a polarization diversity scheme is inserted subsequent to the SSB modulator 8. The polarization switch 9 is provided to suppress a polarization dependent fluctuation of a Brillouin gain.

On the other hand, the other laser light divided by the first optical branch device 4 passes through an optical delay device 11 comprising an optical fiber having a predetermined length, is subjected to intensity modulation by a first optical intensity modulator 13 having a first reference signal generator 12, and is amplified by a first EDFA 14. The intensity-modulated light amplified by the first EDFA 14 passes through a second optical branch 15, and is input as a pump light into the other end of the measurement-target optical fiber FUT, so that the probe light and the pump light are propagated oppositely in the measurement-target optical fiber FUT. Note that the optical delay device 11 is for setting a predetermined delay time between the pump light and the probe light as explained above, and the delay time can be appropriately adjusted by changing the optical fiber length.

The outgoing light from the other end of the measurement-target optical fiber FUT is captured into a light detector 20 through the second optical branch 15, and power thereof is measured. Detection outputs from the light detector 20 are subjected to synchronized detection at the modulation frequency of the pump light and the modulation frequency of the probe light, respectively, by passing through a first lock-in amplifier 21 and a second lock-in amplifier 22 which are connected in series, and only the increment of the probe light originating from a stimulated Brillouin phenomenon is captured as final data at a predetermined sampling rate by a data processing device 23 as measurement means comprising, for example, a personal computer.

Note that the first optical intensity modulator 13 and the second optical intensity modulator 6 comprise, for example, an electro-optic modulator. The first optical branch device 4 and the second optical branch device 15 may be a circulator, a beam splitter, a half mirror, and the like. In a further modified example, the light sources 1 may be separately provided for the probe light and the pump light, respectively.

In the embodiment, the second optical intensity modulator 6, the second EDFA 7, the SSB modulator 8, and the polarization switch 9 constitute probe light generating means 31 for generating a probe light from the output light of the light source 1, and the optical delay device 11, the first optical intensity modulator 13, the first EDFA 14, and the second optical branch device 15 constitute pump light generating means 32 for generating a pump light from the output light of the light source 1, and the light detector 20, the first lock-in amplifier 21, and the second lock-in amplifier 22 constitute detection means 33 for separating only the increment of the probe light originating from stimulated Brillouin scattering from outgoing lights from the measurement-target optical fiber FUT.

As explained above, the apparatus shown in FIG. 1 obeys the basic principle of the BOCDA method, lights from the light source 1 serve as continuous oscillation lights, and the SSB modulator 8 changes the center frequency $f_{probe}$ of the probe light in such a way that the difference between the center frequency $f_{probe}$ of the probe light and the center frequency $f_{pump}$ of the pump light becomes close to the Brillouin frequency $V_B$, while changing the oscillatory frequency of the continuous oscillation light by a sinusoidal repeating waveform through the signal generator 2. Accordingly, at most positions where the phases of the pump light and the probe light are asynchronous and a correlation of both lights is low, stimulation is suppressed, but at a correlation position where the phases of the pump light and the probe light are synchronized, stimulated Brillouin scattering occurs. Shifting the correlation position makes it possible to measure the distribution of strains due to Brillouin scattering.

Correlation positions due to stimulated Brillouin scattering periodically appear along the measurement-target optical fiber FUT sandwiched between the isolator 16 and the circulator (second optical branch device) 15 because modulations of the probe light and the pump light are periodical. Accordingly, the delay amount of the optical delay device 11 and the frequency-modulation frequency $f_m$ applied to the semiconductor laser 3 are adjusted in such a way that only one correlation peak is present at one location in the measurement-target optical fiber FUT. Further, it is necessary to increase the amplitude (modulation amplitude) $\Delta f$ of the frequency modulation to the semiconductor laser 3 to extend the measurement range of the apparatus while maintaining the spatial resolution $\Delta z$ thereof high.

According to the embodiment, an optical wavelength filter for separating the pump light and the probe light is not provided ahead of the light detector 20 which serves as a photo receiver, but the first optical intensity modulator 13 performs intensity modulation on the probe light at a different frequency from the pump light, and synchronous detection is performed at both modulation frequency to the pump light and modulation frequency to the probe light. A scheme of using two synchronous detection means (i.e., lock-in amplifiers 21, 22) in accordance with the modulation frequencies of the probe light and the pump light in detecting only the increment of the probe light is hereinafter called a "double lock-in" scheme. On the other hand, a conventional scheme of performing intensity modulation on only the pump light, of performing synchronous detection at the modulation frequency thereof, and of providing an optical wavelength filter ahead of the photo receiver is called a "single lock-in" scheme.

Next, an explanation will be given of the operation of the double lock-in scheme based on the structure shown in FIG. 1 with reference to FIG. 2 while comparing with the conventional single lock-in scheme. FIG. 2(*a*) shows measurement transitions of the probe light and the pump light according to the single lock-in scheme, and FIG. 2(*b*) shows measurement transitions of the probe light and the pump light according to the double lock-in scheme.

According to the apparatus shown in FIG. 1, as a laser light undergone frequency modulation or phase modulation by the signal generator 2 is emitted from the semiconductor laser 3, the outgoing light is divided by the first optical branch device 4 at a predetermined intensity ratio. The one laser light from the first optical branch device 4 is input into the second optical intensity modulator 6, and is subjected to intensity modulation based on the frequency of a reference signal generated by the second reference signal generator 5. The laser light chopped by the intensity modulation is amplified by the succeeding second EDFA 7, and is input into the SSB modulator 8. The SSB modulator 8 performs SSB modulation on the chopped laser light, generates a sideband having a frequency difference $\Delta V$ close to the Brillouin frequency $V_B$ with respect to the center frequency of the laser light, and the sideband passes through the polarization switch 9 and the isolator 16, and is input as the probe light into the one end of the measurement-target optical fiber FUT.

In contrast, the other laser light divided by the first optical branch device 4 passes through the optical delay device 11 to be given a predetermined delay time, input into the first optical intensity modulator 13, and subjected to intensity modulation based on the frequency of a reference signal generated by the first reference signal generator 12. The frequencies of the individual reference signals of the first reference signal generator 12 and the second reference signal generator 5 differ from each other. The laser light chopped by intensity modulation is amplified by the succeeding first EDFA 14, and input as the pump light into the other end of the measurement-target optical fiber FUT through the second optical branch device 15.

As explained above, the probe light and the pump light propagated in the measurement-target optical fiber FUT are chopped at different frequencies by the second optical intensity modulator 6 and the first optical intensity modulator 13, respectively (see, (1) in FIG. 2(*b*)). On the other hand, according to the conventional single lock-in scheme, the probe light remains as a continuous light (see, (1) in FIG. 2(*a*)). As both such lights are propagated oppositely in the measurement-target optical fiber FUT, in the apparatus shown in FIG. 1, as shown in FIG. 2(*b*), (2), some of the pump light undergone reflection and backward scattering are emitted from the measurement-target optical fiber FUT, and are superimposed on the chopped probe light, and, the increment of the probe light originating from stimulated Brillouin scattering is emitted from the measurement-target optical fiber FUT while chopped by the intensity-modulation frequency of the pump light. In contrast, according to the conventional single lock-in scheme, as shown in FIG. 2(*b*), (1), the waveforms of some of the pump light are same as those of the double lock-in scheme, but the increment of the probe light originating from stimulated Brillouin scattering is generated in a manner superimposed on the continuous probe light.

In the apparatus shown in FIG. 1, as the outgoing light from the measurement-target optical fiber FUT is detected by the light detector 20 and subjected to synchronous detection by the first lock-in amplifier 21 at the intensity-modulation frequency of the pump light, as shown in FIG. 2(*b*), (3), merely some of the pump light including the same intensity-modulation frequency component and the increment of the probe light are picked out, and amplified and output, but the other frequency components are eliminated. Some of the pump light detected by the first lock-in amplifier 21 are not affected by the intensity-modulation frequency of the probe light, but the increment of the probe light originating from stimulated Brillouin scattering likewise detected by the first lock-in amplifier 21 is synchronized with the intensity-modulation frequency of the original probe light. Accordingly, when synchronous detection is performed by the following second lock-in amplifier 22 at the intensity-modulation frequency of the probe light, only the increment of the probe light is picked out, and amplified and output, and other noise components including some of the pump light are completely eliminated at this stage (see, (4) of FIG. 2(*b*)).

That is, in the apparatus shown in FIG. 1, because intensity modulation is performed on the original probe light at a different frequency from the pump light, after synchronous detection is performed on some of the pump light and the increment of the probe light by the first lock-in amplifier 21, only the increment of the probe light necessary for a strain measurement is synchronized with the intensity-modulation frequency of the original probe light. Utilizing this enables the second lock-in amplifier 22 to completely separate the increment of the probe light from other components without an optical wavelength filter. Further, even if the amplitude Δf of the frequency modulation of the light source 1 is made wide to some extent to extend the measurement range of the apparatus while maintaining the spatial resolution Δz high, because the increment of the probe light is not detected using the frequency difference ΔV between the pump light and the probe light, only the necessary increment of the probe light is correctly detected without affection of the amplitude Δf.

In contrast, according to the conventional single lock-in scheme, some of the pump light and the increment of the probe light in the outgoing light from the measurement-target optical fiber FUT are all affected by the intensity-modulation frequency of the pump light, and those lights cannot be separated by synchronous detection. Accordingly, it is necessary to use an optical filter (optical wavelength filter 112) using the frequency difference ΔV between the pump light and the probe light beforehand (see, (3) of FIG. 2(*a*)), as shown in FIG. 2(*a*), (4), only the increment of the probe light can be picked out in distribution measurement having a narrow range, but in attempting to made the amplitude Δf of the frequency modulation of the light source wide to extend the measurement range while maintaining the spatial resolution Δz high, it becomes difficult to eliminate noise components.

Next, an explanation will be given of the experimental example of the apparatus shown in FIG. 1 and the result thereof. In this experimental example, a distributed feedback laser diode (DFB LD) of 1552 nm was used as the semiconductor laser 3 of the light source 1, and sinusoidal frequency modulation was performed to generate correlation peaks in a testing measurement-target optical fiber FUT. The output of the semiconductor laser 3 was directly used as a Brillouin pump light, and amplified by the first EDFA 14 after passing through a fiber for delay of 3 km which served as the optical delay device 11 to control the orders of the correlation peaks. On the other hand, the probe light was generated through the SSB modulator 8. The suppression ratio of the high frequency components in the SSB modulator 8 with respect to the low frequency components was greater than or equal to 25 dB. Intensity modulation was performed on both pump light and probe light, and a chopping frequency for the pump light and a chopping frequency for the probe light were set to, 4.8 MHz and 8.2 kHz, respectively. A photodiode having a bandwidth of 125 MHz was used as the light detector 20, and final data was acquired at a sampling rate of 500 pt/s after the two lock-in amplifiers 22 serially connected.

The frequency-modulation frequency $f_m$ of the semiconductor laser 3 was 310 to 320 kHz depending on the correlation peak positions in the measurement-target optical fiber FUT, which corresponded to the correlation peak interval, i.e., measurement range $d_m$ more than or equal to 320 m according to the foregoing equation 1. The amplitude Δf of the frequency modulation was 15.5 GHz which was larger than the Brillouin frequency $V_B$ (up to 10.8 GHz) of general fibers, and the spatial resolution Δz of the measurement was calculated to about 20 cm from the equation 2. The number of effective sensing points was about 1500.

Figure 3A:
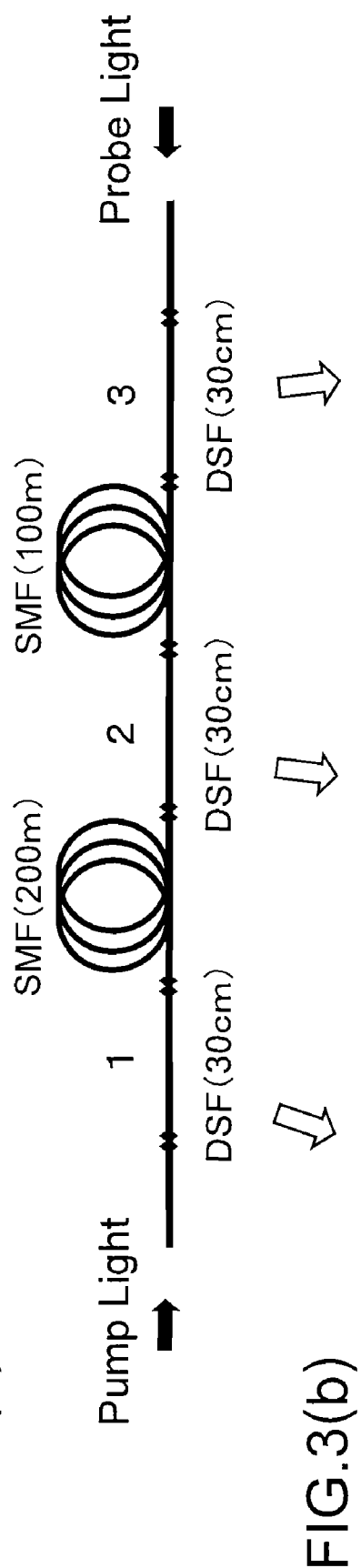
FIG. 3(a) is a diagram showing the structure of a measurement-target optical fiber FUT.
Figure 3B:
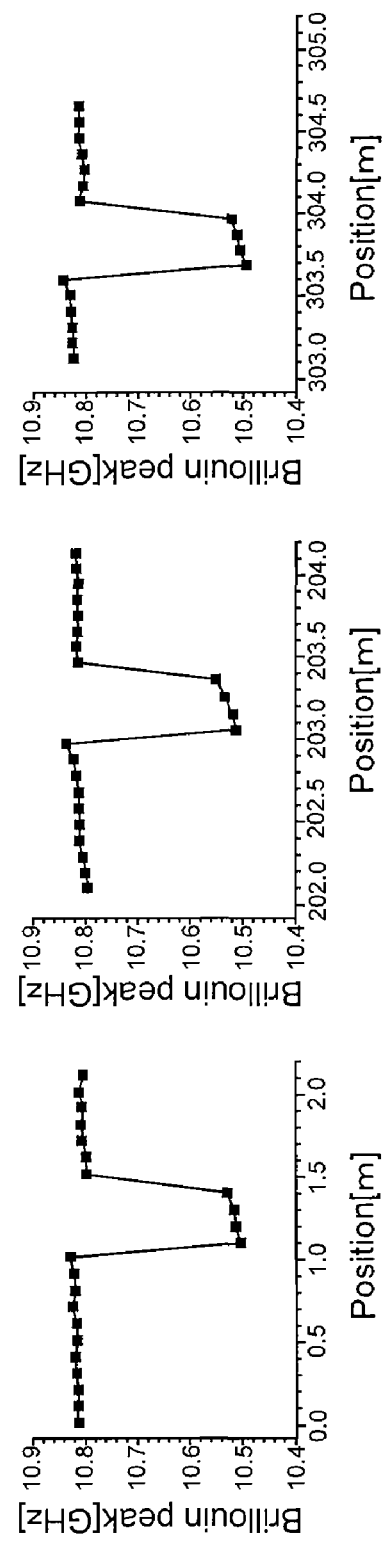
FIG. 3(b) is a graph showing the characteristics of Brillouin peak frequencies measured around a dispersion-shifted optical fiber DSF section in the measurement-target optical fiber FUT.

As shown in FIG. 3(*a*), the measurement-target optical fiber FUT comprised continuous general fibers (SMF: Single Mode optical Fiber) and three dispersion-shifted optical fibers (DSF) each having a length of 30 cm, and had an overall length of about 305 m.

Measurement of a Brillouin gain spectrum BGS was performed for each 10 cm along the measurement-target optical fiber FUT while sweeping the frequency difference ΔV from 10.2 GHz to 11.2 GHz. The measurement speed for one location was 0.5 Hz including the polarization diversity scheme. FIG. 3(*b*) shows characteristics between Brillouin peak frequencies measured around the dispersion-shifted optical fiber DSF sections and positions. Clearly different Brillouin peak frequencies of around 10.5 GHz were observed in the dispersion-shifted optical fiber DSF sections each having 30 cm length, and the measurement range of more than or equal to 300 m was confirmed. The measurement inaccuracy at each point was ±3 MHz, which corresponds to a strain of ±60με.

Figure 4A:
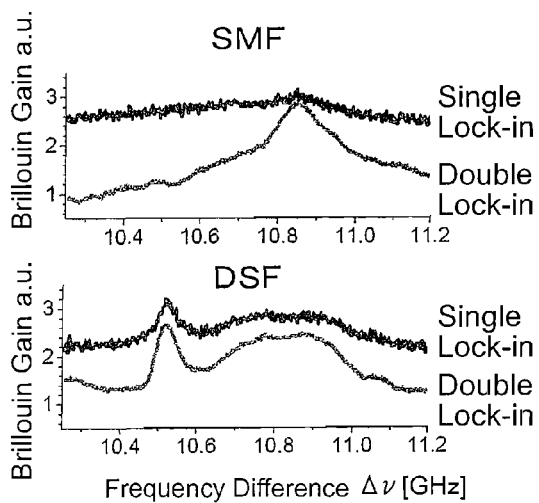
FIGS. 4(a) and 4(b) show comparison data between the single lock-in scheme and the double lock-in scheme.
Figure 4B:
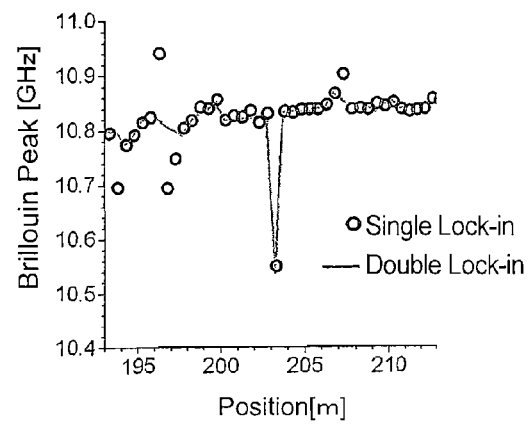

The same measurement with the conventionally-known single lock-in scheme was performed for a comparison, and the shapes of Brillouin gain spectra BGS in the conventional example and the embodiment at the same positions in the single mode optical fiber SMF and the dispersion-shifted optical fiber DSF are shown in the top and the bottom of FIG. 4(*a*). In the case of the single lock-in scheme, a large amount of noises was observed as a large background DC component which is possibly inherent to the backward reflection of the pump light. In contrast, according to the measurement by the double lock-in scheme, the Brillouin gain spectrum BGS appeared further clearly at both sections, and the DC level was suppressed. FIG. 4(*b*) shows both detection by the single lock-in scheme (see, circles in the figure) and detection by the double lock-in scheme (see, lines in the figure), and shows the plots of Brillouin peak frequencies around one dispersion-shifted optical fiber DSF section. A large fluctuation of peak frequencies was observed in the case of the single lock-in scheme. Based on such resultants, the effectiveness of the double lock-in scheme was confirmed in a long measurement range.

Figure 5A:
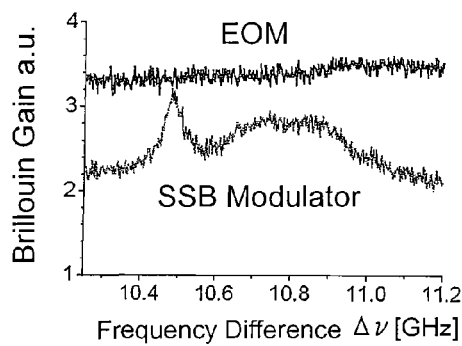
FIGS. 5(a) and 5(b) show comparison data between cases where a general electro-optic modulator EOM and an SSB modulator of the embodiment are used respectively.
Figure 5B:
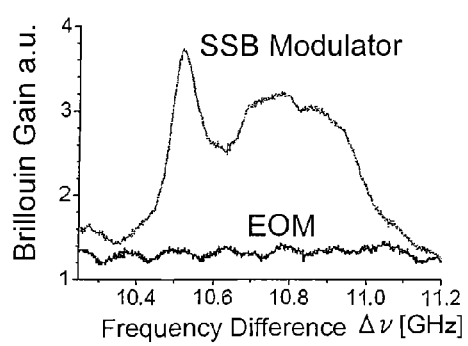

To check the effect of the SSB modulator 8 used in FIG. 1, the same measurement was performed using a general electro-optic modulator (EOM) in lieu of the SSB modulator 8, and these resultants were compared. FIG. 5 is a graph for measured Brillouin gain spectra BGS, and in the case of using the general electro-optic modulator EOM, no Brillouin gain spectrum was observed in both single lock-in scheme shown in FIG. 5(a) and double lock-in scheme shown in FIG. 5(b). That is, the Brillouin gain spectrum BGS is lost in both schemes when the electro-optic modulator EOM is used.

It is thought that the basic reason of such a characteristic is that the Brillouin gain and a loss are counterbalanced by two sidebands from the electro-optic modulator EOM. The experimental result clearly shows that the use of the SSB modulator 8 is requisite in the case of not using an optical filter for a large modulation amplitude ($\Delta f > V_B$).

As explained above, the optical-fiber-characteristic measuring apparatus of the first embodiment comprises the light source 1 as a light source unit which outputs an oscillation light undergone frequency modulation, the probe light generating means 31 for performing frequency shifting on some of the output light from the light source 1 through the SSB modulator 8 serving as frequency shifting means, and inputting the probe light into the one end of the measurement-target optical fiber FUT, the pump light generating means 32 for inputting the remaining of the output light from the light source 1 as the pump light into the other end of the measurement-target optical fiber FUT, the second optical intensity modulator 6 and the first optical intensity modulator 13 serving as modulation means for performing modulations on both probe light and pump light, the detection means 33 for detecting only the increment, i.e., the change in the probe light originating from stimulated Brillouin scattering from outgoing lights from the measurement-target optical fiber FUT using two modulations performed by the modulation means, and the data processing device 23 serving as measurement means for measuring the characteristic of the measurement-target optical fiber FUT from data on the change in the probe light acquired by the detection means 33.

Correspondingly, the optical-fiber-characteristic measuring method of the first embodiment performs frequency shifting on an oscillation light undergone frequency modulation from the light source 1 serving as a light source unit through, for example, the SSB modulator 8, inputs that light as the probe light into the one end of the measurement-target optical fiber FUT, and inputs the oscillation light likewise undergone frequency modulation as the pump light into the other end of the measurement-target optical fiber FUT, performs modulations on both probe light and pump light, separates only the change in the probe light originating from stimulated Brillouin scattering from outgoing lights from the measurement-target optical fiber FUT using two modulations performed on the probe light and the pump light, respectively, and measures the characteristic of the measurement-target optical fiber FUT from data on the change in the separated probe light.

Note that the light source unit may employ not only a structure which generates the probe light and the pump light from the single light source 1, but also a structure which has light sources for the probe light and the pump light, respectively.

According to the foregoing apparatus and method, by performing modulations on both probe light and pump light to distinguish both lights, only the change in the probe light necessary for measuring the characteristic of the measurement-target optical fiber, not utilizing the frequency difference $\Delta V$ between the probe light and the pump light, but utilizing that modulation. Therefore, unlike the conventional technology, the optical wavelength filter 112 becomes unnecessary. Further, in a case where the amplitude $\Delta f$ of the frequency modulation of the light source 1 is made wide to some extent to make the measurement range wide while maintaining the spatial resolution $\Delta z$ high, detection of the change in the probe light is not affected by the amplitude $\Delta f$. Therefore, it is possible to completely separate the increment of the probe light from noises and to extend the measurement range while maintaining the spatial resolution $\Delta z$ high. Further, it is possible to eliminate the concerns such as deterioration of the signal accuracy inherent to the reduction of the utilization efficiency of light energy and the protracted measuring time, indicated together with patent literature 2.

Further, the optical-fiber-characteristic measuring apparatus of the embodiment comprises the first intensity modulator 13 performing intensity modulation on the pump light and the second intensity modulator 6 performing intensity modulation on the probe light at a different frequency from the pump light, both serving as modulation means, the first lock-in amplifier 21 performing synchronous detection on outgoing light from the measurement-target optical fiber FUT at the intensity-modulation frequency to the pump light and the second lock-in amplifier 22 performing synchronous detection on the output from the first lock-in amplifier 21 at the intensity-modulation frequency to the probe light, both serving as the detection means 33.

Correspondingly, the optical-fiber-characteristic measuring method of the embodiment performs intensity modulation on the pump light and performs intensity modulation on the probe light at different frequency from the pump light to perform modulations on both probe light and the pump light, performs synchronous detection on the outgoing light from the measurement-target optical fiber FUT at the intensity-modulation frequency to the pump light, and performs synchronous detection on the output through the former synchronous detection at the intensity-modulation frequency to the probe light, thereby separating only the change in the probe light originating from stimulated Brillouin scattering.

By employing such an apparatus and a method, because intensity modulations are performed on both pump light and probe light at different frequencies, when the outgoing light from the measurement-target optical fiber FUT is subjected to double synchronous detection (double lock-in detection) at the intensity-modulation frequency to the pump light and the intensity-modulation frequency to the probe light, only the change in the probe light necessary for measuring the characteristic of the measurement-target optical fiber FUT can be effectively separated.

Figure 6:
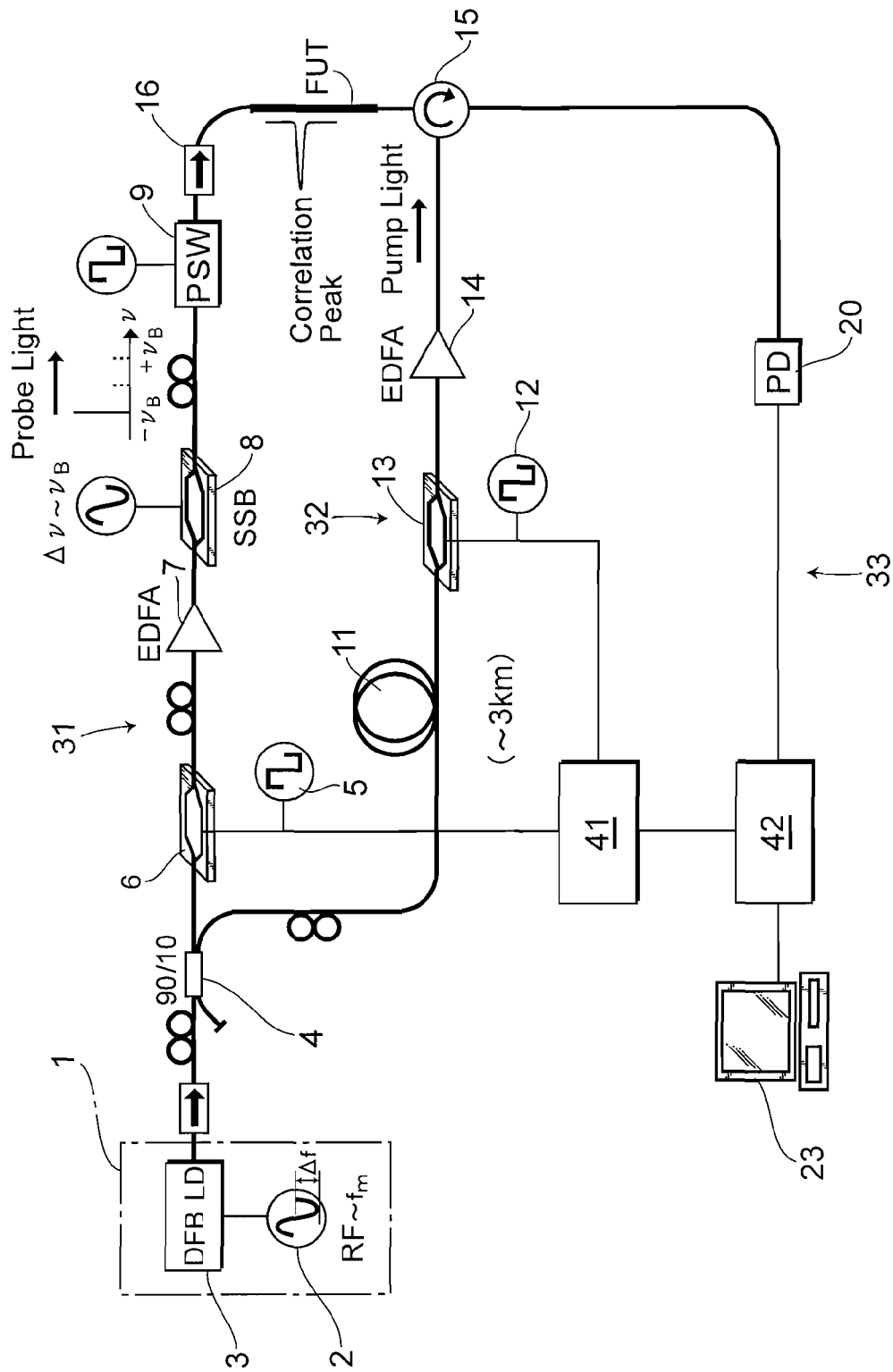
FIG. 6 is a block diagram showing the structure of an optical-fiber-characteristic measuring apparatus according to the second embodiment of the invention.
Figure 8:
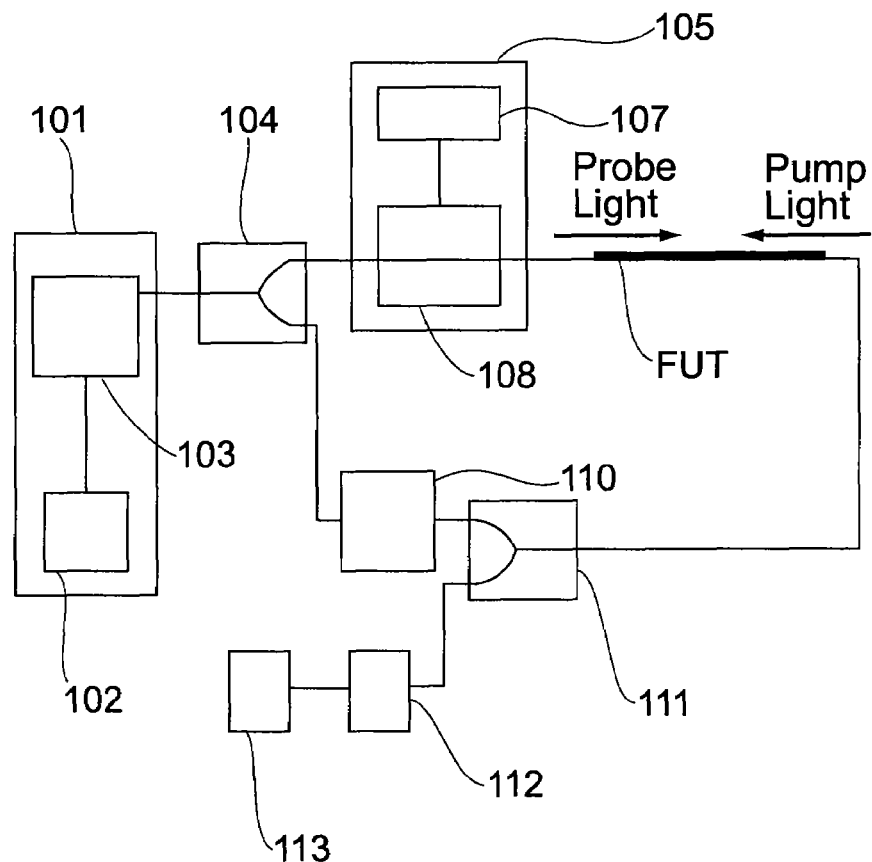
FIG. 8 is a block diagram showing the structure of an optical-fiber-characteristic measuring apparatus of a conventional example.
Figure 9:
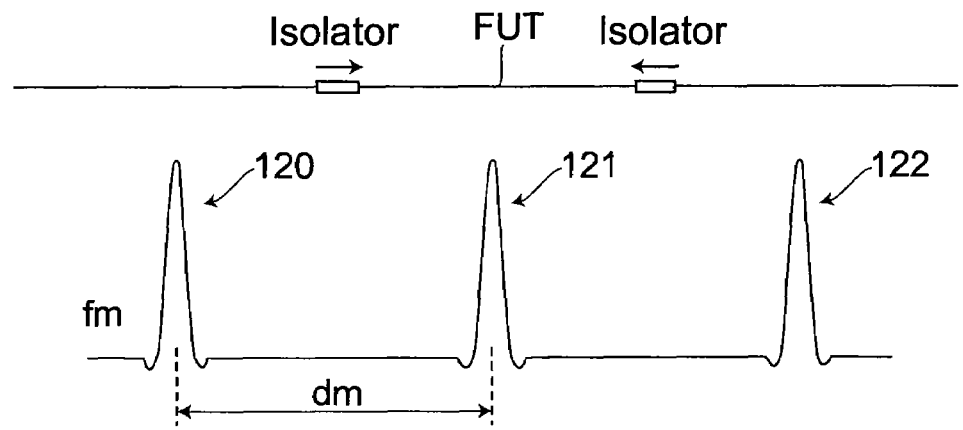
FIG. 9 is a diagram exemplifying correlation peaks in an measurement-target optical fiber in FIG. 8.
Figure 10:
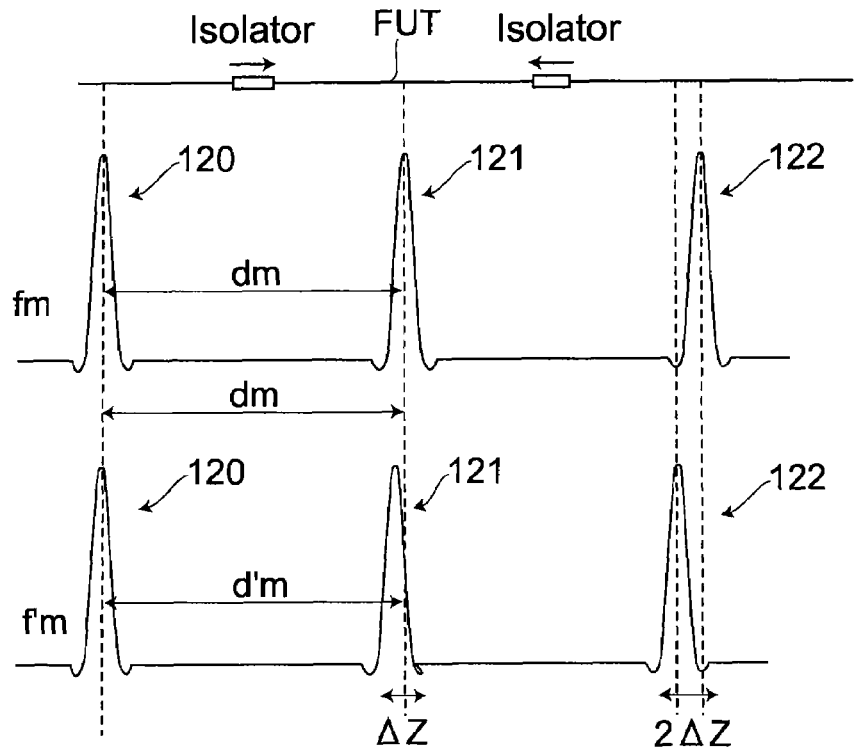
FIG. 10 is a diagram showing how correlation peaks change when a frequency-modulation frequency is changed.
Figure 11:
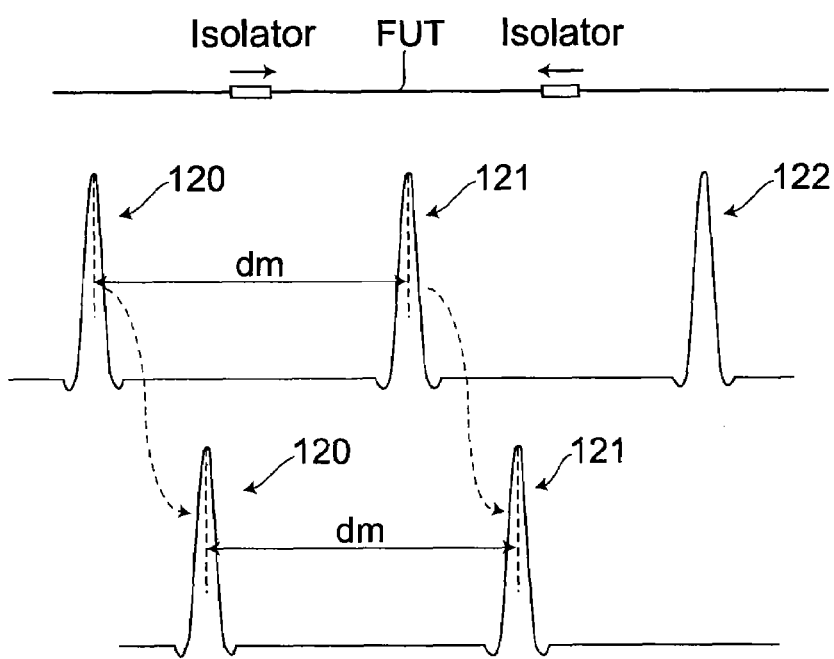
FIG. 11 is a diagram showing how to change the position of a zero-order correlation peak by adjusting a delay time.
Figure 12:
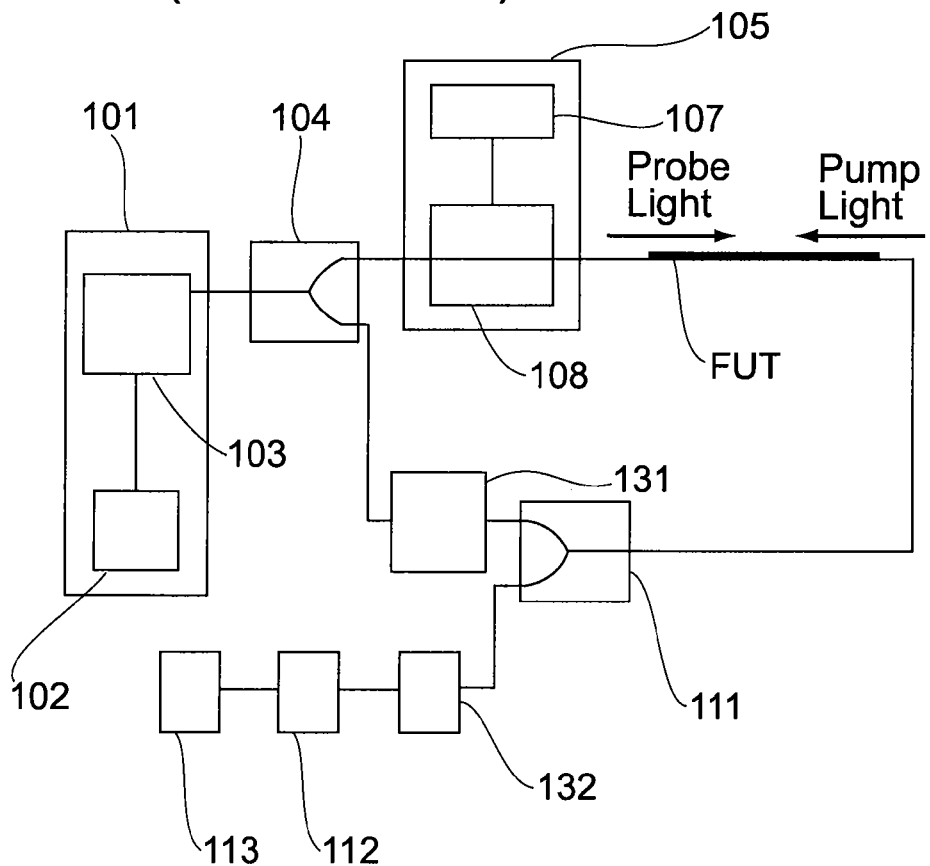
FIG. 12 is a block diagram showing the structure of another optical-fiber-characteristic measuring apparatus of a conventional example.
Figure 13:
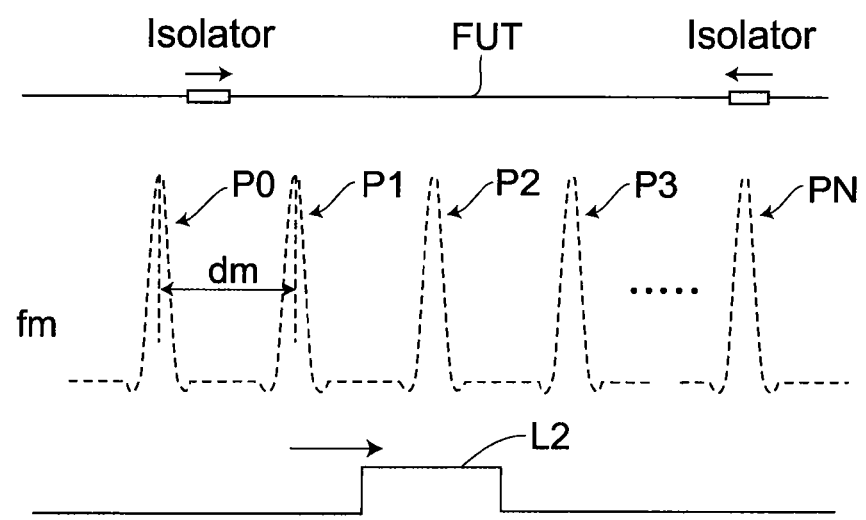
FIG. 13 is a diagram exemplifying correlation peaks in a measurement-target optical fiber of the conventional example.

Next, an explanation will be given of the second embodiment of the invention. FIG. 6 shows an optical-fiber-characteristic measuring apparatus of the second embodiment. In addition to the detector 20 which measures power of the outgoing light from the measurement-target optical fiber FUT, provided as the detection means 33 connected to the data processing device 23 are a beat frequency generator 41 which generates a difference frequency component between the intensity-modulation frequency applied to the pump light by the first reference signal generator 12 and the intensity-modulation frequency applied to the probe light by the second reference signal generator 5, and a lock-in amplifier 42 which performs synchronous detection on a detected output from the light detector 20 by the difference frequency component acquired by the beat frequency generator 41 to separate only the increment of the probe light originating from a stimulated Brillouin phenomenon and to output final data to the following data processing device 23. That is, the second embodiment has a feature to pick out only the increment of the probe light at a time by a solo lock-in amplifier 42 using the frequency difference between the intensity-modulation frequency applied to the pump light and the intensity-modulation frequency applied to the probe light, and such a scheme of synchronous detection by a beat frequency is hereinafter called a "beat lock-in" scheme. Other structures are the same as those of the first embodiment.

In the embodiment, instead providing an optical wavelength filter ahead of the optical detector 20, the first optical intensity modulator 13 performs intensity modulation on the probe light at a different frequency from the pump light. This allows some of the pump light affected by reflection and backward scattering to be emitted from the measurement-target optical fiber FUT, and superimposed on the chopped probe light, and the increment of the pump light originating from stimulated Brillouin scattering to be emitted from the measurement-target optical fiber FUT while chipped by the intensity-modulation frequency of the pump light.

On the other hand, the beat frequency generator 41 generates a difference frequency component between the intensity-modulation frequency applied to the pump light and the intensity-modulation frequency applied to the probe light, and outputs that component to the lock-in amplifier 42. The lock-in amplifier 42 performs synchronous detection on a detected output from the light detector 20 using the difference frequency, and picks out only the increment of the probe light necessary for strain measurement at a time. Therefore, according to the second embodiment, it is possible to completely separate the increment of the probe light from other components by the single lock-in amplifier 42 without an optical wavelength filter. Further, in a case where the amplitude Δf of the frequency modulation of the light source 1 are made wide to some extent to extend the measurement range while maintaining the spatial resolution Δz of the apparatus high, because the increment of the probe light is not detected by utilizing the frequency difference ΔV between the pump light and the probe light, only the necessary increment of the probe light can be correctly detected while unaffected by the amplitude Δf.

Next, an explanation will be given of the experimental example of the apparatus shown in FIG. 6 and the result thereof. An experimental result shown in FIG. 7 corresponds to foregoing FIG. 4(*a*), and the upper part thereof shows the measurement result of Brillouin spectra of a single mode optical fiber SMF by the BOCDA method, and the bottom part shows the measurement result of Brillouin spectra of a dispersion-shifted optical fiber DSF, both regarding a sample measurement-target optical fiber FUT (same as that of the experimental result for the double lock-in scheme) having normal single mode optical fibers (SMF fibers: where Brillouin frequency shift amount is approximately 10.8 GHz), and short dispersion-shifted optical fibers (DSF fibers: where Brillouin frequency shift amount is approximately 10.5 GHz) fused to the corresponding single mode optical fibers.

As is apparent from the experimental result, peaks indicating Brillouin frequencies relating to individual measurement positions were clearly visible at any sections in the beat lock-in scheme of the embodiment in comparison with the conventional single lock-in scheme. In particular, in the bottom figure for the measurement of the dispersion-shifted optical fiber DSF, there is no substantial difference between the height of a peak corresponding the dispersion-shifted optical fiber DSF and the height of a hill-like part of the single mode optical fiber SMF at right in the single lock-in scheme, so that the determination of a peak is difficult. In contrast, in the same figure, a peak corresponding to the dispersion-shifted optical fiber DSF is clarified in the measurement result according to the beat lock-in scheme, so that the effectiveness of the beat lock-in scheme can be confirmed. Also in the upper figure, it becomes apparent that a peak frequency corresponding to the single mode optical fiber SMF can be measured further precisely according to the beat lock-in scheme in comparison with the single lock-in scheme.

That is, according to the single lock-in scheme, the variation width of data (curve) is narrow, and a large bias is present therebelow, but on the other hand, according to the beat lock-in scheme, a bias is small (not present), and the variation width of data (curve) is large, and this is the reason why a peak can be measured precisely. The bias is caused by a component what the pump light intensified by the optical amplifier (first EDFA 14) reflects in the measurement-target optical fiber FUT. The reflection occurs due to backward Rayleigh scattering that inevitably occurs not only at the connection portion of the measurement-target optical fiber FUT, but also in the measurement-target optical fiber FUT, and is difficult to eliminate. In a case where intensity modulation is performed on the pump light, the reflection component is also subjected to intensity modulation, and is difficult to eliminate according to the conventional single lock-in scheme. According to the double lock-in scheme and the beat lock-in scheme of the invention, however, such reflection components become eliminative. The advantage such as eliminating the foregoing bias components is common to both beat lock-in scheme and double lock-in scheme.

Further, according to the double lock-in scheme of the first embodiment, it is necessary to perform two modulations having largely different frequencies for double lock-in detection, and to perform synchronous detection at a relatively low frequency in performing detection through the second lock-in amplifier 22, so that the measurement speed depends on the second reference signal generator 5 and becomes slow. From this standpoint, according to the beat lock-in scheme of the embodiment, it is necessary to merely perform synchronous detection at a time at a difference frequency between the two modulation frequencies, and the synchronous detection frequency at this time can be set high, resulting in an advantage such that the measurement speed can be maintained at an equal level to the conventional single lock-in scheme.

As explained above, the optical-fiber-characteristic measuring apparatus of the embodiment has the first intensity modulator 13 performing intensity modulation on the pump light and the second intensity modulator 6 performing intensity modulation on the probe light at a different frequency from the pump light, both particularly serving as the modulation means like the first embodiment, and the synchronous detector, i.e., the lock-in amplifier 42 which performs synchronous detection on the outgoing light from the measurement-target optical fiber FUT at the difference frequency between the intensity-modulation frequency to the pump light and the intensity-modulation frequency to the probe light. and serves as the detection unit 33.

Correspondingly, the optical-fiber-characteristic measuring method of the embodiment performs intensity modulation on the pump light, and performs intensity modulation on the probe light at a different frequency from the pump light to perform modulations on both probe light and pump light, and performs synchronous detection on the outgoing light from the measurement-target optical fiber FUT at a difference frequency between the intensity-modulation frequency to the pump light and the intensity-modulation frequency to the probe light, thereby separating only the change in the probe light originating from stimulated Brillouin scattering.

By employing such an apparatus and a method, because intensity modulations are performed on both pump light and probe light at different frequencies, when synchronous detection is performed on the outgoing light from the measurement-target optical fiber at a difference frequency between the intensity-modulation frequency to the pump light and the intensity-modulation frequency to the probe light, only the change in the probe light necessary for measuring the characteristic of the measurement-target optical fiber FUT can be effectively separated. Further, because synchronous detection at a time is performed at a difference frequency between the two modulation frequencies, the frequency of the synchronous detection can be set high, and the measurement speed can be maintained fast.

It is to be noted that the present invention is not limited to the foregoing embodiments, and can be changed and modified in various forms within the scope of the invention. For example, frequency modulation in the specification includes the phase modulation technology. A light other than a laser can be used if light sources can output a light undergone frequency modulation. Further, the intensity modulators 6, 13, and the lock-in amplifiers 21, 22, 42 of the individual embodiments can be replaced by intensity modulators and synchronous detectors having the same functions, and in generating the beat frequency in the second embodiment, for example, a sum component of the intensity-modulation frequencies of both lights may be used.

The BOCDA method of the invention improves the limit of the spatial resolution 100 times than the conventional one, and improves the measurement speed 10000 times, and attracts the attention worldwide, and is the only technology which accomplishes a high spatial resolution, a fast measurement speed, and a random-access function to a measurement position in the world. Accordingly, the technology attracts attention as a nerve network to verify how much materials and structures are deteriorated, and is available in various fields, such as civil engineering, construction, aviation, space, nuclear energy, energy, traffic, and transportation. It is expected that the invention improves the performance further, and accelerates the practical application.

The invention claimed is:

1. An optical-fiber-characteristic measuring apparatus comprising:
   a light source unit which outputs an oscillation light that has undergone frequency modulation;
   probe light generating means for performing frequency shifting on an output light from the light source unit, and inputting that light as a probe light into one end of a measurement-target optical fiber, said probe light generating means including a second optical intensity modulation unit that performs intensity modulation on the probe light;
   pump light generating means for inputting an output light from the light source as a pump light into an other end of the measurement-target optical fiber, said pump light generating means including a first optical intensity modulation unit that performs intensity modulation on the pump light at a different frequency from the probe light;
   detection means for separating only a change in the probe light originating from stimulated Brillouin scattering from an outgoing light from the measurement-target optical fiber, using the two intensity modulations performed by the first and the second optical intensity modulation units; and
   measurement means for measuring a characteristic feature of the measurement-target optical fiber based on data on the change in the probe light, acquired by the detection means.

2. The optical-fiber-characteristic measuring apparatus according to claim 1, wherein
   the detection means includes a first synchronous detection unit, which performs synchronous detection on an outgoing light from the measurement-target optical fiber at an intensity-modulation frequency to the pump light, and a second synchronous detection unit, which performs synchronous detection on an output from the first synchronous detection unit at a intensity-modulation frequency to the probe light.

3. The optical-fiber-characteristic measuring apparatus according to claim 1, wherein
   the detection means includes a synchronous detection unit, which performs synchronous detection on an outgoing light from the measurement-target optical fiber at a difference frequency between an intensity-modulation frequency to the pump light and an intensity-modulation frequency to the probe light.

4. An optical-fiber-characteristic measuring method comprising:
   performing frequency shifting on an oscillation light that has undergone frequency modulation;
   inputting that light as a probe light into one end of a measurement-target optical fiber;
   inputting the oscillation light that has undergone frequency modulation as a pump light into an other end of the measurement-target optical fiber;
   performing intensity modulation on the pump light, and performing intensity modulation on the probe light at a different frequency from the pump light;
   separating only a change in the probe light originating from stimulated Brillouin scattering from an outgoing light from the measurement-target optical fiber, using the two intensity modulations performed on the probe light and the pump light; and
   measuring a characteristic of the measurement-target optical fiber from data on the change in the probe light.

5. The optical-fiber-characteristic measuring method according to claim 4, further comprising:
   performing synchronous detection on an outgoing light from the measurement-target optical fiber at an intensity-modulation frequency to the pump light, and performing synchronous detection on an output acquired by that synchronous detection at an intensity-modulation frequency to the probe light to thereby separate only the change in the probe light originating from stimulated Brillouin scattering.

6. The optical-fiber-characteristic measuring method according to claim 4, further comprising:
   performing synchronous detection on an outgoing light from the measurement-target optical fiber at a difference frequency between an intensity-modulation frequency to the pump light and an intensity-modulation frequency to the probe light to thereby separate only the change in the probe light originating from stimulated Brillouin scattering.

* * * * *